United States Patent [19]

McKibbin

[11] Patent Number: 5,472,383
[45] Date of Patent: Dec. 5, 1995

[54] LUBRICATION SYSTEM FOR A PLANETARY GEAR TRAIN

[75] Inventor: Albert H. McKibbin, Cromwell, Conn.

[73] Assignee: United Technologies Corporation, Hartford, Conn.

[21] Appl. No.: 173,019

[22] Filed: Dec. 27, 1993

[51] Int. Cl.$^6$ .......................... F16H 57/04; B60R 17/00; F16N 7/32
[52] U.S. Cl. .......................... 475/159; 475/344; 74/468; 184/6.12; 184/6.13
[58] Field of Search .......................... 74/468; 475/159, 475/344; 184/6.12, 6.13, 6.26, 6.27, 11.1, 11.2, 11.3, 13.1

[56] References Cited

U.S. PATENT DOCUMENTS

| | | | |
|---|---|---|---|
| 2,343,492 | 3/1944 | Bartolett | 184/6.12 X |
| 2,684,591 | 7/1954 | Lundquist | 475/344 X |
| 2,703,021 | 3/1955 | Stoeckicht | 475/344 X |
| 2,749,778 | 6/1956 | Kuhn | 475/344 X |
| 3,121,474 | 2/1964 | Matt | 184/6.12 |
| 3,160,026 | 12/1964 | Rosen | 475/344 X |
| 3,307,433 | 3/1967 | Bennett et al. | 475/344 X |
| 3,650,353 | 3/1972 | Abbott | 475/159 X |
| 3,776,067 | 12/1973 | DeBruyne et al. | 475/159 |
| 4,271,928 | 6/1981 | Northern | 184/6.4 |
| 4,745,816 | 5/1988 | Horiuchi et al. | 184/6.12 X |
| 5,251,725 | 10/1993 | Barrett | 74/468 X |

FOREIGN PATENT DOCUMENTS

| | | | |
|---|---|---|---|
| 3607711 | 10/1986 | Germany | 475/159 |
| 4216400 | 11/1993 | Germany | 475/344 |
| 270554 | 11/1986 | Japan | 475/159 |

Primary Examiner—Rodney H. Bonck
Assistant Examiner—Nathan O. Jensen
Attorney, Agent, or Firm—Kenneth C. Baran

[57] ABSTRACT

A lubrication system for a planetary gear train (6) includes oil spray bars (32) intermediate each pair of planet gears (10). Oil exits the meshes between the sun gear 8 and the planet gears (10) and between the planet gears (10) and the ring gear (18) with substantial tangential velocity. The expelled oil enters an oil discharge passage (62) in an oil collection channel (56) adjacent to and axially outboard of the ring gear (18). In the preferred embodiment, herringbone gears are used and rotate so that oil within the gear meshes is pumped axially outward toward the channels. Interplanet baffles (80) and collection troughs (82) may also be used and are especially beneficial in an alternative embodiment which uses bihelical gears whose direction of rotation pumps oil within the gear meshes axially inward.

8 Claims, 3 Drawing Sheets form the tangential velocity component. The axially
LUBRICATION SYSTEM FOR A PLANETARY GEAR TRAIN

TECHNICAL FIELD

This invention relates to planetary gear trains and more particularly to an improved lubrication system characterized by rapid, efficient recovery of spent lubricant. The invention is especially useful in aircraft engines where high power transmission efficiency is important.

BACKGROUND ART

Planetary gear trains are supplied with a suitable lubricant such as oil to reduce friction and provide wear protection for gear teeth, bearing surfaces, and other contacting surfaces in relative motion. The lubricant is also a medium for conducting waste heat away from the gear train.

In typical prior art gear trains, once the oil is spent, i.e. has lubricated and cooled the gear train, gravity causes the oil to drain into a sump below the bottom of the gear train. Oil that collects in the sump is pumped through the lubrication system coolers, filters and deaerators to be reconditioned for continual use.

Such passive collection of the spent oil does not lend itself to rapid removal of oil from the gear train. Spent oil which remains in the gear system adds to the fluid drag or windage against the moving surfaces and also reenters the gear meshes where it is agitated by the gear teeth. This results in high parasitic power losses and higher oil temperature than would be experienced if the spent oil were rapidly removed. Moreover, since spent oil is not cooled until it is removed from the gear train and made available to the lubrication system heat exchangers, the retention of spent oil in the gear system causes ineffective heat transfer out of the oil.

Because of the accumulation of oil in the gear train, the lubrication system contains a greater volume of oil than it would if the oil were rapidly removed and recirculated through the system. This is a disadvantage in applications such as aircraft where weight and compactness are important.

Therefore, it is seen that the traditional passive approach of removing the spent oil by draining it into a sump contributes to parasitic power losses, introduces heat transfer inefficiencies and contributes undesirable weight and bulk to the lubrication system. In view of these shortcomings, an oil recovery system that reduces parasitic power losses and enhances heat transfer by rapidly removing the spent oil is sought.

DISCLOSURE OF THE INVENTION

According to the present invention, oil delivery conduits supply fresh oil to a planetary gear train having herringbone gear teeth. Spent oil, which has cooled and lubricated the gear teeth, is rapidly removed from the gear train by exploiting the axial pumping action of the herringbone gears to urge the spent oil axially outward to be deposited into oil collection channels, each of which has a discharge passage for conducting the spent oil from the gear train.

The oil delivery conduits of the present invention are positioned circumferentially intermediate each pair of planet gears. Each conduit directs a spray of fresh oil at the sun gear and at one of the planet gears. Some of the oil reflects off the gears, but most of it is carried into the mesh between the sun gear and the circumferentially adjacent planet gear as well as into the mesh between the planet gear and the ring gear.

After the oil lubricates and cools the gear teeth, it is expelled from each gear mesh with substantial tangential velocity.

The invention uses herringbone gears which are attractive in part because of their well known smoothness of operation. Herringbone gears also pump the oil within any gear mesh axially outward toward the end faces of the gears or axially inward toward the center plane of the gear train depending on the direction of gear rotation. The preferred embodiment takes unique advantage of this pumping characteristic by employing gear rotational directions that pump oil axially outward. Therefore, oil expelled from the gear meshes has an axially outward velocity component in addition to a tangential velocity component. The axially outward velocity component directs the oil toward circumferentially extending oil collection channels positioned axially outward of the end faces of the ring gear. At least a portion of the spent oil proceeds into the oil collection channels, each of which has at least one discharge passage for ducting the oil to the lubrication system filters, heat exchangers and deaerators.

Baffles may be positioned intermediate each pair of planet gears to prevent oil expelled from each planet gear/sun gear mesh from impinging on and being agitated by the adjacent planet gear, thereby increasing parasitic power losses. Each baffle has an axially extending collection trough that guides the captured oil axially outward for deposition into the oil collection channels. The oil delivery conduits may be integrated into the radially inner ends of the baffles for compactness.

In an alternative embodiment of the invention, the gears are bihelical and rotate so that oil within the gear meshes is pumped axially inward toward a gap between the left hand and right hand gear teeth prior to being expelled from the gear meshes. Because the oil is pumped axially away from the oil collection channels, this arrangement benefits more from the interplanet baffles and troughs than does the axially outward pumping embodiment. As in the preferred embodiment, the troughs redirect the oil axially outward while the baffles shield each planet gear from oil expelled by its neighboring planet gear.

The foregoing constructions, operation and advantages of the invention will become more apparent in light of the following detailed description of the best mode for carrying out the invention, and the accompanying drawings.

BEST MODE FOR CARRYING OUT THE INVENTION

Figure 1:
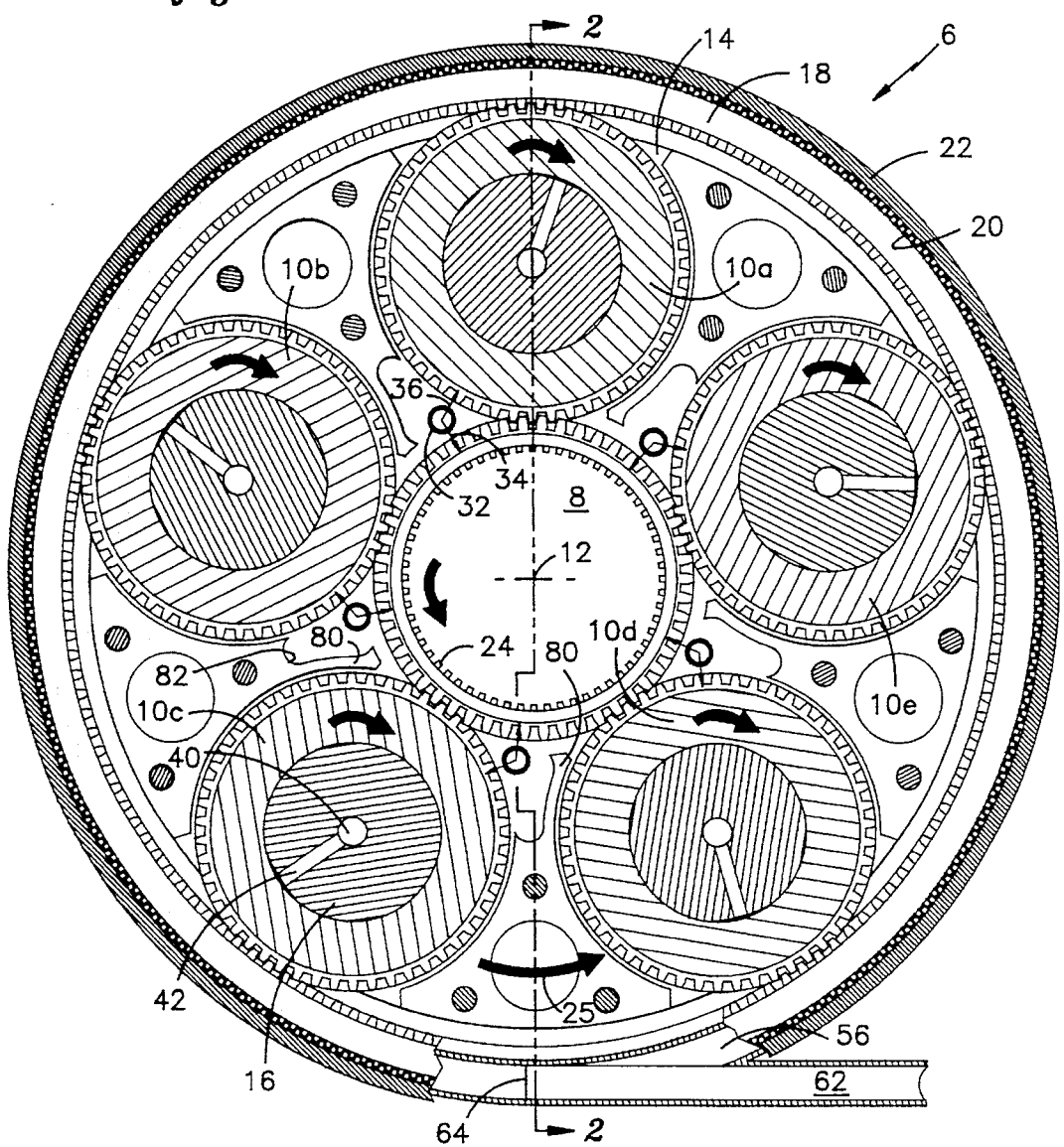
FIG. 1 is a frontal sectional elevation of a planetary gear train incorporating the lubrication system of the present invention.
Figure 2:
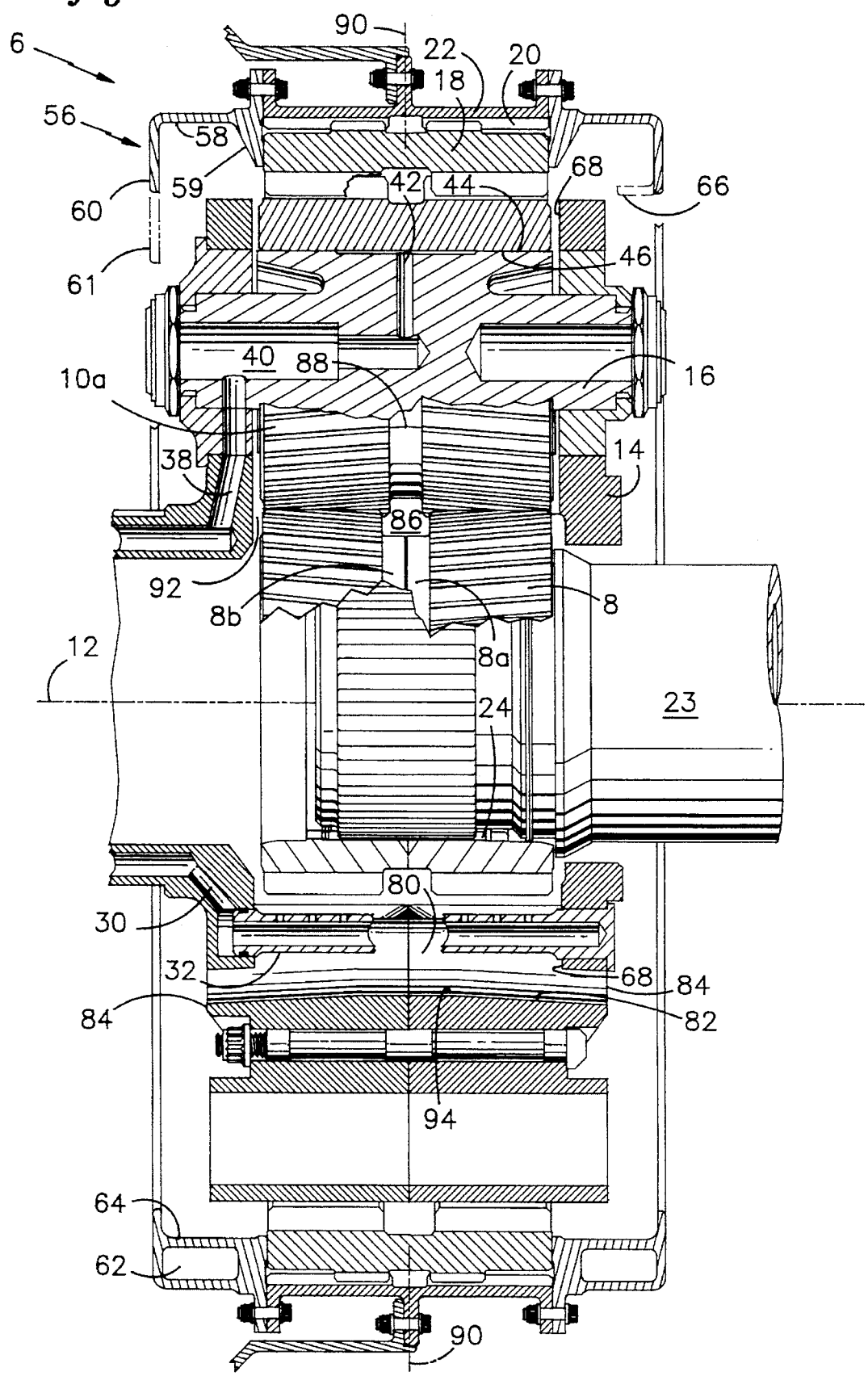
FIG. 2 is a side elevation, mostly in section, of the planetary gear train taken along the irregular section line 2—2 of FIG. 1 with fragmented portions of the sun gear and planet gear, out of the plane of the section line, shown unsectioned to illustrate the gear teeth.
Figure 3:
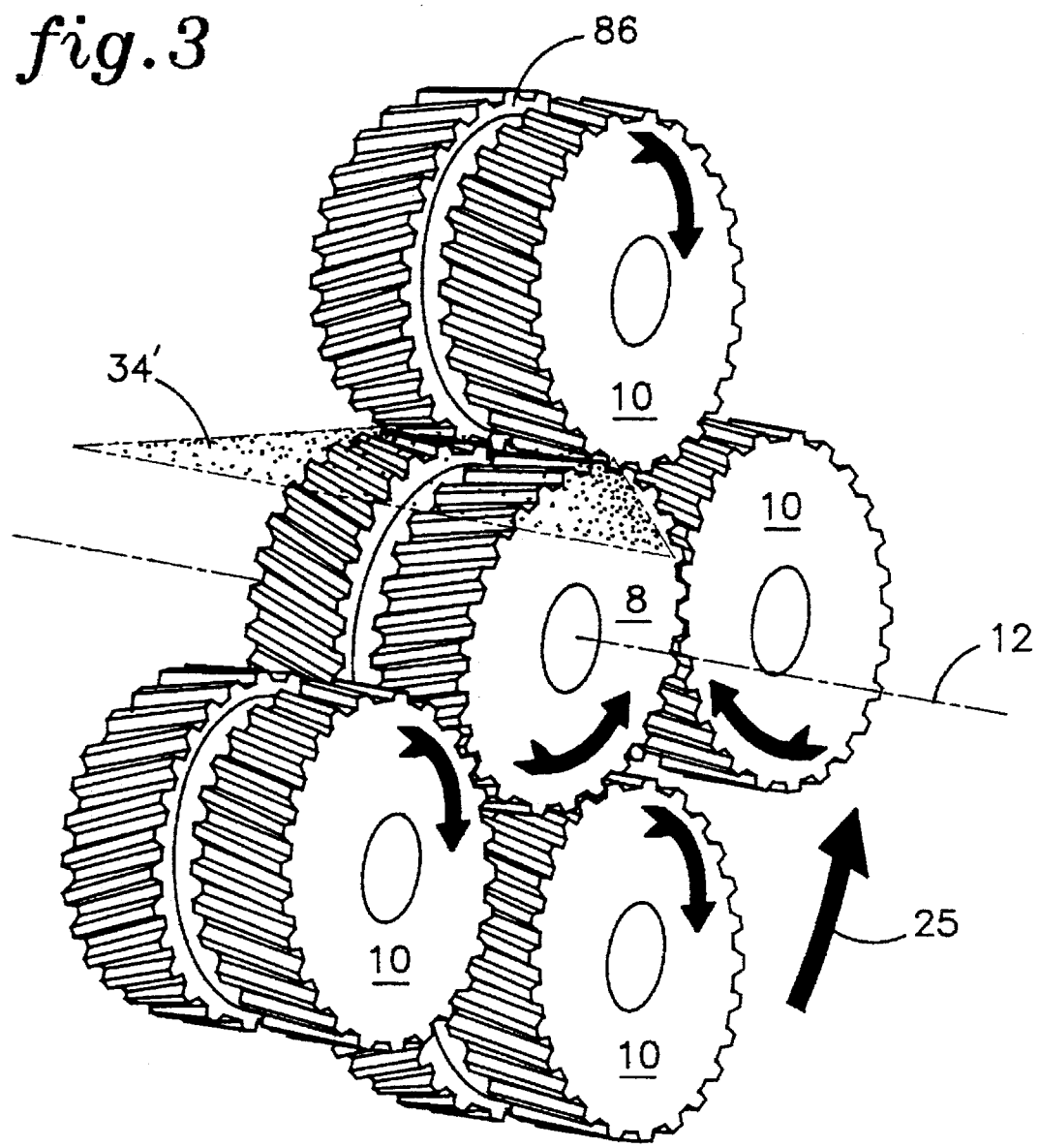
FIG. 3 is a simplified perspective view of the sun gear and selected planet gears of a planetary gear train illustrating the flow pattern of oil expelled from one sun/planet mesh according to the present invention.

Referring to FIGS. 1–3, a planetary gear train 6, typical of prior art planetary gear trains only in the manner in which the gears transmit mechanical power, includes a central sun gear 8 rotating about a longitudinal central axis 12. The sun gear meshes with a plurality of planet gears 10a, 10b, 10c, 10d, 10e each of which is rotatably mounted in a planet carrier 14 by a journal pin 16. A ring gear 18 also meshes with the planet gears. The ring gear is mechanically grounded, for example by splines 20, to a nonrotating ring gear housing 22 so that the ring gear is stationary with respect to the central axis. Typically one or more of the ring gear, sun gear and planet carrier are split into two pieces along a plane perpendicular to the axis to facilitate gear train assembly and disassembly.

An input shaft 23 is connected to the sun gear by splines 24 or other suitable means of connection. The shaft is driven by a source of rotary motion (not shown) such as a gas turbine engine, to rotate the sun gear. The sun gear rotation causes the planet gears to rotate on their journal pins. Because the ring gear is stationary, the planet gears orbit the sun gear causing the planet carrier to rotate (as shown by 25) about the central axis. The planet carrier motion is the output motion of the gear train and is transmitted out of the gear train with a shaft or other suitable mechanical arrangement which is not embraced by the present invention and therefore is not shown.

According to the present invention, oil delivery conduits supply oil from a source (not shown) to the gear system components. Passages 30 feed oil to axially extending oil delivery conduits such as spray bars 32 (shown partially broken away) positioned circumferentially intermediate each pair of planet gears and proximate the sun gear for directing sprays of oil 34, 36 onto the sun and planet gear teeth. The spray bars are stationary with respect to the carrier. Other passages 38 deliver oil to the interior of the journal pins. Passages 40, 42, internal to each pin, guide the oil to the outer perimeter of the pin for lubricating the pin outer surface 44 and the bore 46 of the corresponding planet gear.

Circumferentially extending oil collection channels 56 are positioned adjacent to and axially outward of each ring gear end face. The channels are stationary with respect to the central axis and each channel has a radially inward facing oil collection surface 58, and inner and outer side walls 59, 60. At least one discharge passage 62 extends from each channel for conducting the collected oil to the oil system coolers, filters and deaerators. Inlets 64 at the end of each discharge passage admit oil, which is expelled from the gear meshes with a substantial tangential velocity component, into the discharge passages. It may be advantageous to extend the side walls 60 radially inward, as shown by phantom extension 61 on FIG. 2, so that the side walls 59, 60, the collection surface 58 and the planet carrier 14 define a semi-enclosed annular chamber to better contain the collected oil. Alternatively, oil containment may be improved with a cover 66, also shown in phantom on FIG. 2, extending axially from each side wall 60.

The invention may also include baffles 80 positioned intermediate each pair of planet gears for shielding each planet gear from oil expelled by the neighboring sun/planet mesh (or reflected from the sun gear) and for guiding that oil radially outward. The baffles are stationary with respect to the carrier and extend axially between the carrier inner surfaces 68. An oil collection trough 82 at the radially outer end of each baffle collects the spent oil. The trough penetrates the carrier walls so that outlets 84 at either end of each trough discharge oil into the collection channels. As seen best in FIG. 2, the surface 94 of the trough is preferably inclined over a least a portion of its axial length so that the radial distance from the central axis 12 to the trough increases as the axial distance from the center plane 90 increases. This geometry encourages oil in the trough to flow toward the outlets 84 where it is expelled into the collection channels with a high tangential velocity due to carrier rotation.

Preferably, the radially inner end of each baffle is circumferentially spaced from the neighboring spray bar in the direction of carrier rotation so that oil reflected off the sun gear has sufficient time to travel radially outward and be captured by the baffle rather than passing radially inward of the baffle and into the mesh of the sun gear and the adjacent planet gear.

The gears 8, 10, 18 of the invention are continuous or discontinuous herringbone gears. Herringbone gears are a pair of helical gears of opposite hand placed side by side on a common axis. In a continuous herringbone gear, the oppositely handed teeth, which are oblique to the gear axis, meet to form an apex at the center plane of the gear. Discontinuous herringbone gears, more commonly known as bihelical gears, have oppositely handed teeth that terminate short of the center plane leaving a gap, such as the gap 86, between corresponding left and right hand teeth. Accordingly, bihelical gears form an imaginary apex such as apex 88 (FIG. 1) rather than a true apex.

It is known that the line of contact between two meshing herringbone gear teeth propagates along the tooth flanks so that much of the oil within the mesh is urged or pumped axially in the direction of propagation of the line of contact. If a herringbone gear rotates so that each tooth apex proceeds ahead of the rest of the tooth in the direction of gear rotation, oil within the gear mesh is pumped axially outward. Conversely, if the gear rotates so that each tooth apex trails behind the rest of the tooth in the direction of gear rotation, oil within the gear mesh is pumped axially inward. The invention uses herringbone gears so that this pumping characteristic can be exploited to ensure rapid oil removal. In the preferred embodiment of the invention the gears rotate so that oil is pumped axially outward using either continuous or discontinuous herringbone gears.

Either the sun gear or the ring gear is split into two pieces along a center plane 90 perpendicular to the longitudinal axis so that they can be assembled with the planet gears and planet carrier to make a complete gear train. The choice of which gear to split is at least partly determined by the direction of the axial pumping action, which imposes an axial reaction force on the gears. For the axially outward pumping configuration of the preferred embodiment, the reaction force acts axially outward on the ring gear, tending to separate its left and right sides, and axially inward on the sun gear tending to clamp its left and right sides together. Therefore, the ring gear is one piece to give it maximum resistance to the separating force while the sun gear is split into two pieces 8a, 8b since the clamping force seats the two pieces together.

The operation of the oil recovery system can be appreciated by examining the flow of oil 34, 36 introduced by the spray bar located between planet gears 10a and 10b (FIG. 1). Some of the oil 34 sprayed onto the sun gear teeth, reflects off the teeth and is captured by the baffle 80 which helps reduce parasitic power loss by preventing the reflected oil from impinging on and being agitated by adjacent planet gear 10b. The remainder of oil 34 is carried into the mesh of the sun gear and planet gear 10b where it is pumped axially outward by the gear teeth. Thus, as best seen in FIG. 3, as the teeth come out of mesh the spent oil 34' expelled from the mesh fans out with both tangential velocity (relative to the sun and planet gears) in the direction of carrier rotation 25 due to the gear and carrier rotation, and axial velocity due to the axial pumping of the meshing gear teeth. Because the pumping action urges much of the oil axially outward, the expelled oil is distributed nonuniformly across the axial length of the gears so that a greater quantity of expelled oil is present near the gear end faces and a lesser quantity near the center plane 90. Accordingly, a significant portion of the expelled oil proceeds into a space 92 between the carrier and the planet gears and then into the collection channels 56, while the remainder of the expelled oil is captured by the baffle. The baffle prevents the expelled oil, as well as oil reflected from the sun gear, from impinging on and being agitated by the teeth of planet gear 10*b*. Although the expelled oil has a high tangential velocity with respect to the planet gears, it has a radial velocity component in the frame of reference of the rotating carrier and baffle. Therefore, the oil flows radially outward along the baffle to the collection trough 82.

Oil 36 which is sprayed onto planet gear 10*a* is carried by the planet gear into its mesh with the ring gear. Oil expelled after the planet and ring gear teeth come out of mesh exits the mesh with axial velocity due to the axial pumping action of the meshing gear teeth and tangential velocity in the direction of carrier rotation due to the carrier rotation. Consequently, the oil is expelled axially outward toward the collection channels 56 and tangentially toward the inlet openings 64 of the discharge passages 62.

Oil is also supplied to the surfaces 44 and 46 at the bore of each planet gear and the outer periphery of each journal pin. Because this oil is delivered under pressure, it flows axially outward through the annulus between surfaces 44 and 46 regardless of the direction of gear rotation. The oil is discharged at the end faces of each planet gear and, like the oil expelled from the sun/planet mesh, proceeds radially outward relative to the carrier into the oil collection channels.

In an alternative embodiment, the direction of gear rotation is opposite to that just described so that oil within the gear meshes is pumped axially inward. The gears are bihelical and the inwardly pumped oil flows into the gap 86 between the teeth. As in the preferred embodiment, oil is expelled from the gear meshes with both tangential and axial velocity components; however, the axial velocity component is directed inward toward the center plane. Consequently, the inward pumping embodiment, in order to operate efficiently, is more likely to require the interplanet baffles and troughs to redirect the oil axially outward toward the collection channels and to shield each planet gear from oil expelled by its advancing neighbor. In addition, the reaction forces resulting from the axial pumping action of the gears act axially outward on the sun gear and axially inward on the ring gear so that it may be desirable to employ a single piece sun gear and a split ring gear.

The inward pumping arrangement may not reduce the parasitic power loss as much as the outward pumping arrangement since spent oil could accumulate at the gap 86 and interfere with evacuation of spent oil from the mesh. Furthermore, the interplanet baffles and troughs, which are more likely to be necessary in the inward pumping arrangement, are a possible disadvantage in applications where weight, cost and complexity are significant factors.

Although the invention has been described in the context of a planetary gear train having an input sun gear, an output planet carrier and a nonrotating ring gear, the invention will, of course, work for gear trains whose input gear is other than the sun gear and whose output gear is other than the planet carrier.

The oil delivery conduits may be made integral with the baffle with both the spray bars and the baffles functioning as already described. The integral baffle/conduit configuration may be attractive if interplanet space is limited, however this configuration will not capture oil reflected off the sun gear.

I claim:

1. In a planetary gear train having a sun gear, a plurality of planet gears rotatably mounted in a carrier and meshing with said sun gear, and a ring gear meshing with said planet gears, said sun gear, planet gears and ring gear being herringbone gears, and wherein at least two of said sun gear, planet carrier and ring gear are rotatable about a central axis, a lubrication system, characterized by:

oil delivery conduits which are stationary with respect to said carrier and circumferentially intermediate each pair of said planet gears for delivering fresh oil to said gear train;

oil collection channels which are adjacent to and axially outward of each ring gear end face and stationary with respect to said central axis for receiving spent oil; and at least one discharge passage extending from each of said channels having an inlet for admitting spent oil into said discharge passage.

2. The lubrication system of claim 1 characterized by baffles which are stationary with respect to said carrier and circumferentially intermediate each pair of planet gears and which extend axially between the inner surfaces of said carrier, the radially outer end of each baffle defining an axially extending trough which penetrates said carrier for directing spent oil radially and axially outward for deposition into said oil collection channels.

3. The lubrication system of claim 1 wherein said oil delivery conduits are spray bars.

4. The lubrication system of claim 1 wherein each apex formed by the teeth of the rotating gears proceeds ahead of the rest of its tooth in the direction of gear rotation so that oil within each gear mesh is pumped axially outward.

5. The lubrication system of claim 1 wherein each apex formed by the teeth of the rotating gears trails behind the rest of its tooth in the direction of gear rotation so that oil within each gear mesh is pumped axially inward.

6. The lubrication system of claim 4 wherein the sun gear, planet gears and ring gear are continuous herringbone gears.

7. The lubrication system of claim 5 wherein the sun gear, planet gears and ring gear are discontinuous herringbone gears.

8. In a planetary gear train having a sun gear, a plurality of planet gears rotatably mounted in a carrier and meshing with said sun gear, and a ring gear meshing with said planet gears wherein at least two of said sun gear, planet carrier and ring gear are rotatable about a central axis, and wherein said sun gear, planet gears and ring gear are herringbone gears, a lubrication system, characterized by:

said herringbone gears rotating so that each apex formed by the teeth of said rotatable gears proceeds ahead of the rest of its tooth in the direction of gear rotation so that oil within each gear mesh is pumped axially outward;

oil delivery spray bars stationary with respect to said carrier and circumferentially intermediate each pair of said planet gears for delivering fresh oil to said gear train;

oil collection channels adjacent to and axially outward of each ring gear end face and stationary with respect to said central axis for receiving spent oil;

at least one discharge passage extending from each of said channels having an inlet for admitting spent oil into said discharge passage; and baffles, circumferentially intermediate each pair of planet gears and stationary with respect to said carrier, the radially inner end of each baffle being circumferentially spaced from the neighboring one of said spray bars, said baffles extending axially between the inner surface of said carrier, the radially outer end of each baffle defining an axially extending trough which penetrates said carrier for directing spent oil radially and axially outward for deposition into said oil collection channels.

* * * * *